3 Sheets—Sheet 1.
H. S. SHEPARDSON.
LOCKS FOR DOORS, &c.
No. 171,873.    Patented Jan. 4, 1876.
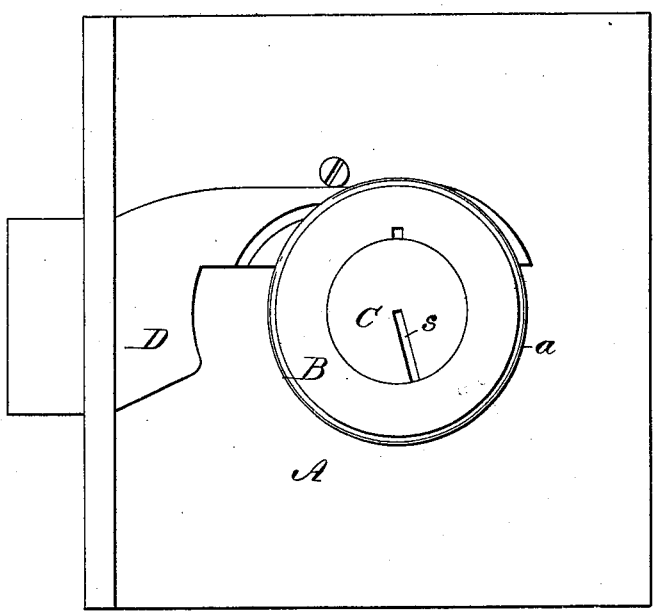
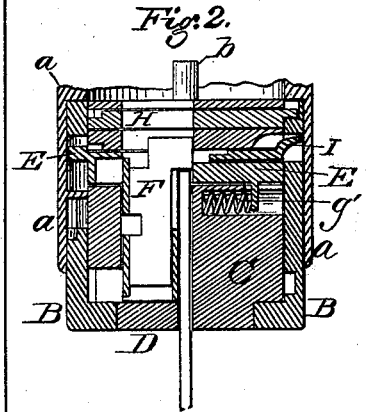
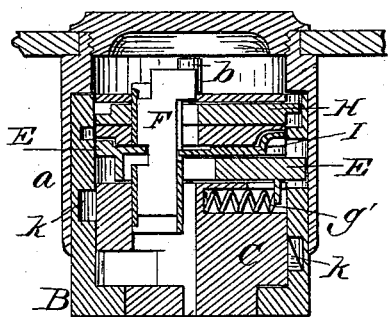
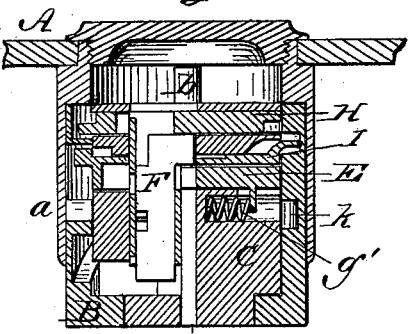
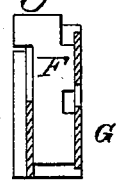
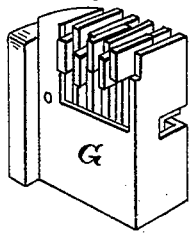
WITNESSES:
Will H. Dodge.
Donn Twitchell.
INVENTOR:
H. S. Shepardson
By his attys,
Dodge & Son, H. S. SHEPARDSON.
LOCKS FOR DOORS, &c.
No. 171,873.
3 Sheets—Sheet 2.
Patented Jan. 4, 1876.
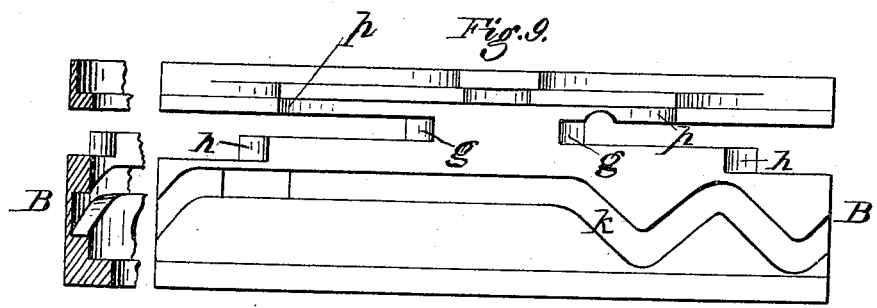
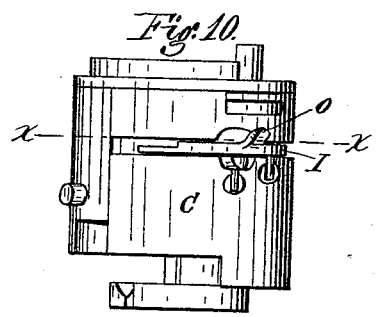
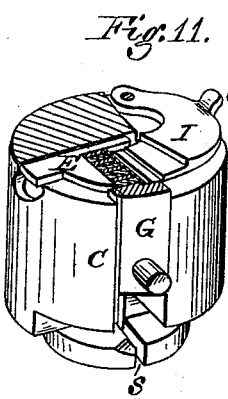
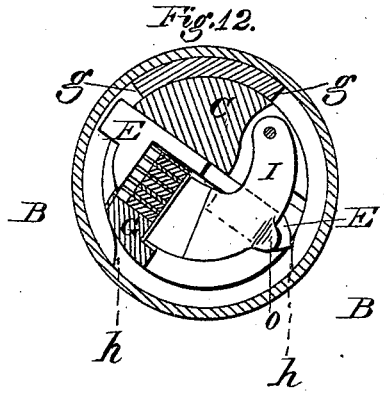
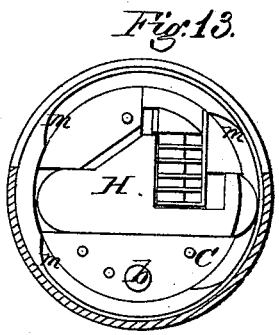
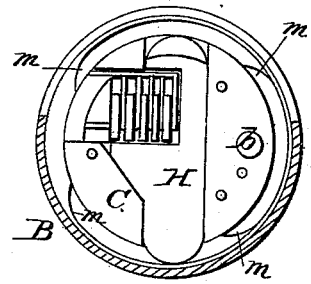
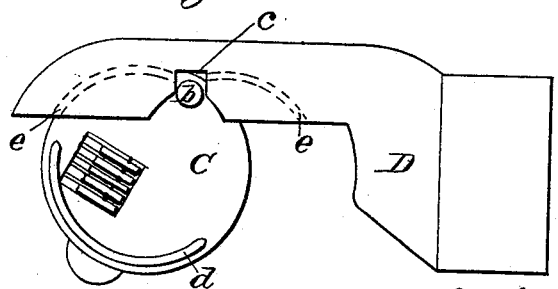
WITNESSES:
Will W. Dodge
Donn Twitchell
INVENTOR:
H. S. Shepardson
By his atty,
Dodge & Son
N. PETERS, PHOTO-LITHOGRAPHER, WASHINGTON, D. C.

H. S. SHEPARDSON.
LOCKS FOR DOORS, &c.
No. 171,873.
3 Sheets—Sheet 3.
Patented Jan. 4, 1876.
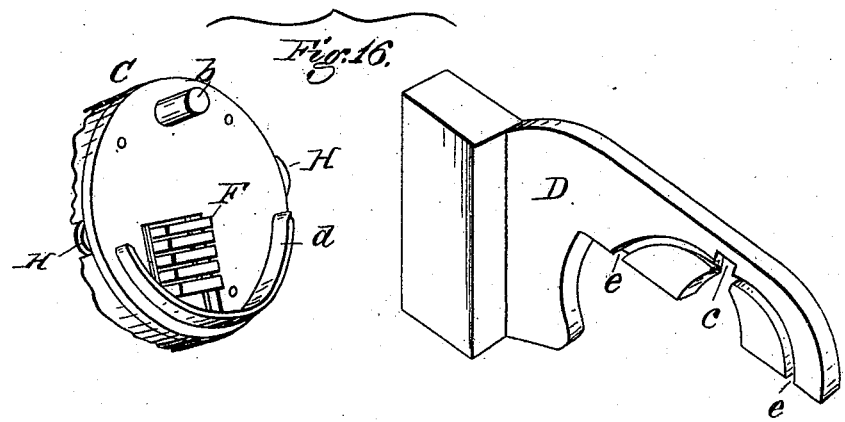
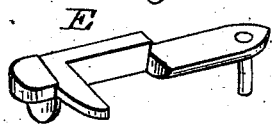
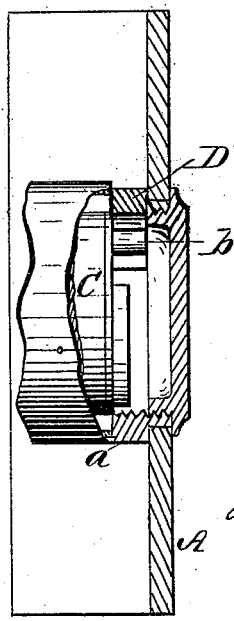
WITNESSES:
Will W. Dodge.
Donn Twitchell.
INVENTOR:
H. S. Shepardson
By his attys.
Dodge & Son.

UNITED STATES PATENT OFFICE.

HENRY S. SHEPARDSON, OF SHELBURNE FALLS, MASSACHUSETTS.

IMPROVEMENT IN LOCKS FOR DOORS, &c.

Specification forming part of Letters Patent No. 171,873, dated January 4, 1876; application filed October 13, 1875.

CASE B.

*To all whom it may concern:*

Be it known that I, HENRY S. SHEPARDSON, of Shelburne Falls, in the county of Franklin and State of Massachusetts, have invented certain Improvements in Locks, of which the following is a specification:

My invention relates to that class of locks in which the bolt is moved and held by means of a rotary cylindrical barrel mounted in a fixed sleeve, and provided with a transverse locking-bar, and with sliding tumblers, which are arranged in a sliding box, and operated by the end of a flat key, which latter also rotates the barrel.

The first improvement relates to the manner of connecting the bolt and the rotary barrel; and consists in providing the bolt with a notch and two circular grooves, and the barrel with a stud and rib to engage therein, as hereinafter explained.

The second improvement consists in combining with the sliding tumbler-box a transversely-sliding bar arranged to engage with the gated tumblers and throw them out of line after the movement of the bolt.

The third improvement relates to an arrangement to prevent access to the tumblers at certain times; and consists in a plate pivoted in the barrel and operated by a cam in the surrounding sleeve in such a manner as to close the key-hole below the tumblers.

Figure 1 is an inside face view of my lock; Fig. 2, a longitudinal central section through the body of the lock with the key inserted, but not turned; Fig. 3, a similar view with the parts in the positions which they occupy during the movement of the bolt; Fig. 4, a similar view during the restoration of the tumblers after the movement of the bolt; Figs. 5, 6, 7, and 8, views showing the sliding tumblers and the sliding box in which they are mounted; Fig. 9, a development or plane-projection of the interior surface of the sleeve in which the rotary barrel is mounted, showing the cams and cam-grooves by which the cut-off plate, locking-bar, restoring-bar, and tumbler-box are operated; Fig. 10, a side view of the rotary barrel or hub and its attendant parts removed from the lock; Fig. 11, a perspective view of the same, cut in two at the line $x\,x$, showing the arrangement of the cut-off, and locking-bar, and tumbler-box; Fig. 12, a cross-section through the body of the lock, with the locking-bar in position to prevent the barrel from throwing the bolt; Fig. 13, a cross-section through the upper end of the lock-body, with the restoring-bar in position to act upon the tumblers; Fig. 14, a similar view, with the restoring-bar thrown back clear of the tumblers; Fig. 15, a face view of the bolt and the rotary-operating barrel; Fig. 16, a perspective view of said parts separated in order to show them more clearly; Fig. 17, a perspective view of the bar by which the rotary barrel is locked; Fig. 18, a cross-section, showing the action of the barrel on the bolt.

A represents the body-plate of the lock, having on its inner face a rigid thimble, $a$, in which there is firmly secured a sleeve or shell, B, containing the rotary barrel or hub C, which serves to operate the sliding bolt D, the inner end of which latter is seated in a notch in the thimble $a$, and arranged to slide past the end of the barrel, as shown in Figs. 1, 15, and 18. The manner in which the rotary barrel and the sliding bolt are connected is clearly represented in Figs. 15, 16, and 18, in which it will be seen that the end of the barrel is provided with a stud, $b$, on one side, and a concentric rib, $d$, on the other, and that the bolt is provided with a notch, $c$, and two curved grooves, $e$, on opposite sides thereof, so that when the parts are in position the rotation of the barrel causes the stud and the rib to engage alternately with the bolt, the stud entering the notch and moving the bolt forward or backward, and then disengaging, while the rib enters one or the other of the grooves and locks the bolt in position. By the peculiar construction and arrangement of the parts the bolt is moved with an easy and positive motion; and in case of the bolt being subjected to a backward pressure, it exerts no tendency to turn the barrel, or to affect the internal parts in such manner as to strain them, or guide one in picking the lock.

The barrel C is at all times free to make a partial revolution, but is held at the proper times from moving sufficiently to throw the bolt by means of a sliding bolt or bar, E, mounted transversely in the barrel or hub, and engaging at one end against shoulders $g$, formed on the inside of the stationary sleeve B, as shown in Fig. 12. The bar E is made of a length greater than the diameter of the barrel, and has the end which abuts against the shoulders made square, and provided with an arm extending across the face of the tumblers F, which are mounted in a sliding box, G, seated in a longitudinal groove or recess in the sides of the barrel, as shown in Figs. 2, 3, 11, &c., so that when the tumblers are gated the arm of the bar E can drop therein, as shown in Figs. 3 and 11, allowing the end of the bar to clear the shoulders $g$, and permitting the barrel to rotate and throw the bolt in either direction. This movement of the bar E inward clear of the shoulders $g$ is caused, the instant that the tumblers are adjusted to permit it, by means of a spiral spring, $g'$, mounted in the barrel, and pressing against a stud on the under side of the bar, as shown in Figs. 2, 3, and 4. The return movement of the bar to throw its arm out of the tumblers, and protrude its locking end beyond the barrel again, is caused by inclines $h$, two of which are formed on the inside of the shell or sleeve B, in such positions that as the locking end of the bar passes outside of either shoulder $g$ the forward end of the bar will ride against one of the inclines $h$, and the bar be thereby pushed backward, as clearly shown in Fig. 12. After the bolt has been thrown by the rotation of the barrel, and the bar E has moved outward to lock the barrel, the tumblers are thrown out of line, in order to prevent the bar E from being again moved to release the barrel. The arrangement for thus throwing the tumblers out of line or restoring them, as it is technically termed, forms the second of my improvements. The tumblers are, as already stated, arranged to slide in a sliding box, G. This box has on one side a stud or pin, which enters a cam-groove, $k$, formed around the inside of the sleeve or tube B; so that as the barrel or hub is rotated the box G is moved lengthwise therein, carrying the entire series of tumblers up and down, without, however, changing their positions in relation to each other. The key-hole $s$, adapted to receive a flat key with its bits on the end, is made lengthwise in the center of the barrel, by the side of the sliding tumbler-box, as shown in Figs. 2, 3, 4, and 11, the ends of the tumblers projecting across the key-hole, so as to be moved inward as the key is pushed against them. The cam-groove by which the box of tumblers is moved is so shaped and the other parts are so arranged that when the barrel is in position to admit the key the box of tumblers is moved up close to the front end of the barrel.

When the key is inserted, its ends gate the tumblers, or, in other words, set them in the proper relative position to each other, the tumblers, however, remaining too far forward to permit the movement of the bar E endwise. When, however, the key is turned, and the barrel C thereby rotated, the cam-groove causes the tumbler-box to slide backward until the notches in the tumblers are opposite the arm of the bar E, whereupon the spiral spring throws the bar endwise, leaving the barrel free to turn until its rib $d$ disengages from the bolt, and the stud $b$ moves the same forward or backward, as the case may be. After the movement of the bolt is completed, and the bar has again locked, a continuing rotation of the barrel causes the tumbler-box to slide forward and then backward again, the latter movement being for the purpose of carrying the ends of the tumblers against a restoring-bar, by which they are moved so as to throw their notches out of line.

H represents this restoring-bar, mounted transversely in the inner end of the barrel C, and moved to and fro therein by its ends bearing against cams or inclines $m$ on the inside of the stationary sleeve or shell as the barrel is rotated. The bar H is provided, as shown in Fig. 14, with a notch or opening, through which the tumblers can freely pass.

When the bolt of the lock is being thrown, the restoring-bar stands in the position shown in Fig. 14, and permits the tumblers to slide with the box G; but after the bolt has been moved, and the tumbler-box drawn forward, the bar is moved over to the position shown in Fig. 13, so that when the tumbler-box is again carried backward, as happens before the key can be withdrawn, the bar engages on the ends of the tumblers and holds them back while the box G moves on, thereby sliding the tumblers forward in the box, and throwing their notches, which are at different distances from the ends, out of line, in which position they remain until the box again carries them forward to be acted upon by the key.

The third feature of my invention is the cut-off for closing the key-hole. It consists, as shown in Figs. 2, 3, 11, 12, &c., simply of a plate, I, pivoted in a slot in the barrel in such manner that its end can be swung across the key-hole the instant that the tumblers commence moving backward from the key toward the point at which they release the locking-bar E. An arm, $o$, is formed on the edge of the cut-off, and cam-surfaces $p$ formed on the interior of the shell or sleeve B, as in Fig. 9, for the purpose of acting on said arm as the barrel rotates, and thereby forcing the cut-off inward. A spiral spring is also mounted within the barrel for the purpose of forcing the cut-off outward as it is released by the cam.

The arrangement of the parts is such that the key-hole is entirely closed below the tumblers the moment that the barrel begins to move, effectually shutting off communication between the key-hole and the moving parts of the lock while the bolt is moving, and preventing the feeling or moving of the tumblers or other parts at any time when a pressure can be brought upon them to guide the operator in adjusting them.

It is obvious that the cut-off plate may be arranged to slide instead of swing, as shown.

Having thus described my invention, what I claim is—

1. The combination of the sliding bolt D, provided with the notch c and grooves e, and the rotary barrel C, provided with the stud b and rib d, substantially as shown.

2. In combination with the rotary barrel C, having the sliding box of tumblers mounted therein, the sliding restoring-bar H, operated by the cams on the interior of the fixed shell or sleeve B, as shown.

3. In combination with the rotary barrel C, and the tumblers mounted therein, the cut-off plate I, and the fixed shell B, provided with cams or inclines for operating the same.

HENRY S. SHEPARDSON.

Witnesses:
 FRANCIS R. PRATT,
 TIMOTHY CRONAN.